(12) United States Patent
Durand et al.

(10) Patent No.: US 11,098,613 B2
(45) Date of Patent: Aug. 24, 2021

(54) RETENTION DEVICE FOR A COOLING TUBE FOR A TURBOMACHINE CASING

(71) Applicant: SAFRAN AIRCRAFT ENGINES, Paris (FR)

(72) Inventors: Didier Noël Durand, Moissy-Cramayel (FR); Nicolas Delaporte, Moissy-Cramayel (FR); Anthony Pierre Beguin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/758,723

(22) PCT Filed: Oct. 25, 2018

(86) PCT No.: PCT/FR2018/052655
§ 371 (c)(1),
(2) Date: Apr. 23, 2020

(87) PCT Pub. No.: WO2019/081861
PCT Pub. Date: May 2, 2019

(65) Prior Publication Data
US 2020/0362725 A1 Nov. 19, 2020

(30) Foreign Application Priority Data
Oct. 27, 2017 (FR) ...................... 1760145

(51) Int. Cl.
*F01D 11/24* (2006.01)
*F01D 25/12* (2006.01)
*F01D 25/24* (2006.01)

(52) U.S. Cl.
CPC ............. *F01D 25/12* (2013.01); *F01D 25/24* (2013.01); *F05D 2230/237* (2013.01); *F05D 2260/20* (2013.01); *F05D 2260/30* (2013.01)

(58) Field of Classification Search
CPC .......... F01D 11/24; F01D 25/12; F01D 25/24; F05D 2230/237; F05D 2250/41;
(Continued)

(56) References Cited

U.S. PATENT DOCUMENTS 3,330,313 A 7/1967 Rosell
4,859,142 A * 8/1989 Burke ...................... F01D 11/24
415/116
(Continued)

FOREIGN PATENT DOCUMENTS

FR 1 258 238 A 4/1961
FR 1 351 676 A 2/1964
(Continued)

OTHER PUBLICATIONS

International Search Report as issued in International Patent Application No. PCT/FR2018/052655, dated Jan. 14, 2019.

*Primary Examiner* — Igor Kershteyn
(74) *Attorney, Agent, or Firm* — Pillsbury Winthrop Shaw Pittman LLP

(57) ABSTRACT

A retention device for at least one cooling tube of a cooling system of a turbomachine casing, the casing extending around an axial direction of the turbomachine, the retention device includes a fixing plate suited to being made integral with the casing and a retention element for the cooling tube. The retention device includes an adjustment system configured to adjust the relative position of the retention element with respect to the fixing plate and to absorb a relative movement between the retention element and the fixing plate.

13 Claims, 2 Drawing Sheets

(58) Field of Classification Search
CPC ........... F05D 2260/20; F05D 2260/201; F05D 2260/30; F05D 2260/52; F05D 2260/96; F02C 7/18; Y02T 50/60
See application file for complete search history.

(56) References Cited

U.S. PATENT DOCUMENTS

| | | | | |
|---|---|---|---|---|
| 5,540,547 | A * | 7/1996 | Cole | F01D 25/12 |
| | | | | 415/177 |
| 5,867,976 | A * | 2/1999 | Ziegler, Jr. | F01D 21/003 |
| | | | | 60/803 |
| 6,185,925 | B1 * | 2/2001 | Proctor | F01D 11/24 |
| | | | | 60/806 |
| 7,857,264 | B2 * | 12/2010 | Carter | F16L 3/04 |
| | | | | 248/65 |
| 8,573,078 | B2 * | 11/2013 | Sue | G01D 11/30 |
| | | | | 73/866.5 |
| 10,618,665 | B2 * | 4/2020 | Leutard | F01D 21/003 |
| 2008/0089775 | A1 | 4/2008 | Lee et al. | |
| 2010/0068043 | A1 * | 3/2010 | Shteyman | F01D 25/14 |
| | | | | 415/177 |
| 2015/0345328 | A1 * | 12/2015 | Prestel | F01D 25/14 |
| | | | | 415/116 |
| 2016/0003088 | A1 * | 1/2016 | Cohin | F16L 3/221 |
| | | | | 60/806 |

FOREIGN PATENT DOCUMENTS

| | | |
|---|---|---|
| FR | 1 454 790 A | 10/1966 |
| FR | 2 995 022 A1 | 3/2014 |
| FR | 3 002 590 A1 | 8/2014 |
| FR | 3 021 700 A1 | 12/2015 |

* cited by examiner

RETENTION DEVICE FOR A COOLING TUBE FOR A TURBOMACHINE CASING

CROSS-REFERENCE TO RELATED APPLICATIONS

This is the U.S. National Stage of PCT/FR2018/052655, filed Oct. 25, 2018, which in turn claims priority to French Application No. 1760145, filed Oct. 27, 2017, the entire contents of all applications are incorporated herein by reference in their entireties.

TECHNICAL FIELD OF THE INVENTION

The technical field of the invention is, generally speaking, that of turbomachines, and more particularly that of the cooling of different elements of a turbomachine, notably turbomachine low pressure turbine casings.

The present invention more particularly relates to a retention device for a system for cooling a turbomachine low pressure turbine casing by air jets.

TECHNOLOGICAL BACKGROUND OF THE INVENTION

To ensure the cooling of certain casings, and notably low pressure turbine casings, a cooling device is provided which involves a set of cooling tubes, also called cooling ramps, pierced with holes and arranged on the outside of the casing, usually while surrounding said casing, in such a way that air, sucked in upstream of the turbomachine with respect to the direction of flow of the gases in the turbomachine, is sent to the outer face of the casing. The cooling system is further composed of two boxes, arranged on either side of the casing, supplying the cooling tubes, such that each box supplies with air the cooling tubes surrounding the casing over around a quarter of its circumference.

Cooling systems of LPTCC (Low Pressure Turbine Clearance Control) type are known. The LPTCC system may be controlled by FADEC (Full Authority Digital Engine Control) for aircraft engine; one then speaks of active control, the system then being designated by the acronym LPTACC. When it is not controlled by FADEC, one speaks of passive control for the LPTCC system. Its main function is to adjust the clearance between the parts of the low pressure turbine by modulating the cooling and the flow rate of air taken from the secondary stream for the cooling of the low pressure turbine casing.

The cooling tubes of LPTCC or LPTACC systems are retained in position around the casing by supply boxes and by fixing plates, integral with the casing. The fixing plates are generally flat plates under which are fixed fixing collars, also called shower collars. The fixing collars surround the cooling tubes and guarantee their positioning around the casing.

To this end, FIG. 1a shows a first perspective view of a cooling system 1 for a low pressure turbine casing of a turbomachine according to the prior art. FIG. 1a shows a turbomachine casing 2, a cooling system 1 for cooling the casing 2 comprising a plurality of cooling tubes 3, a supply box 4 supplying the plurality of cooling tubes with air, a plurality of fixing plates 5 to retain the cooling tubes 3 in position around the casing 2.

FIG. 1b shows a second perspective view of the cooling system 1 for turbomachine casing according to the prior art.

FIG. 1b more particularly shows a fixing plate under which is fixed a plurality of collars 6, each collar 6 surrounding a cooling tube 3.

A certain clearance (in the radial direction of the turbine) is provided between the fixing collars or the cooling tubes and the outer envelope of the casing notably to avoid any contact of the parts (fixing collars, cooling tubes, casing) which could cause damage.

However, the clearance between the cooling tubes and the outer envelope of the casing must be the most restricted possible to position the cooling tubes as near as possible to the envelope of the casing and to optimise the cooling thereof.

In practice, technological, technical constraints, such as notably the tolerances of the parts, vibratory phenomena in operation, the expansions of parts in operation, impose moving away the cooling tubes to avoid any contact between the fixing collars (or the cooling tubes) which could damage the parts in contact, and notably the outer envelope of the casing.

The current technical difficulty is finding a good compromise for radial positioning of the cooling tubes making it possible to avoid wear of the parts while making the cooling system the most efficient possible. Indeed, an optimal clearance is difficult to guarantee and to control because the casing and the cooling tubes are parts of large diameter and the different intermediate parts involved in the retention of the tubes cause an accumulation of tolerances which consequently increase the minimum acceptable clearance.

Different solutions have been described making it possible to better respond to certain constraints, notably on turbomachines of small size. Such solutions are notably described in the documents FR1258238, FR1351676 and FR1454790.

The document FR1454790 describes for example a solution making it possible to better control the positioning of the cooling tube by decreasing the number of intermediate parts for the retention of the cooling tubes. Such a solution notably makes it possible to minimise the accumulation of tolerances linked to each intermediate part and thus to better control the positioning of the cooling tubes.

However, in certain situations and in certain turbomachine configurations, known solutions are not entirely satisfactory and cooling efficiency constraints impose reducing clearances. In these situations, contacts between the fixing collars or the cooling tubes and the casing envelope can arise.

GENERAL DESCRIPTION OF THE INVENTION

The invention offers a solution to the aforementioned problems, by proposing a retention device enabling a fine and precise adjustment of the position of the cooling tubes during mounting around the casing so as to control the clearance between the cooling tubes and the envelope of the casing as a function notably of the actual dimensional constraints of the assembled parts and the engine performances determined during test campaigns.

To this end, the invention relates to a retention device for at least one cooling tube of a cooling system of a turbomachine casing, the casing extending around an axial direction of the turbomachine, the retention device comprising a fixing plate suited to being made integral with the casing and a retention element for the cooling tube, said retention device being characterised in that it comprises an adjustment means configured to adjust the relative position of said retention element with respect to said fixing plate and to absorb a relative movement between the retention element and the fixing plate.

Apart from the characteristics mentioned in the preceding paragraph, the retention device according to the invention may have one or more of the complementary characteristics among the following, considered individually or according to all technically possible combinations thereof:

said fixing plate comprises an opening and said adjustment means comprise a body integral with said retention element, said body being translationally movable through said opening;

said body is a cylindrical body having a threaded portion;

said adjustment means comprise a screwing element cooperating with said threaded portion of said body to adjust the relative position of said retention element with respect to said fixing plate;

the screwing element is a self-locking nut;

said adjustment means comprises an elastic return element to absorb a relative movement between the retention element and the fixing plate;

said retention element is configured to be arranged in integral contact with a radially outer part of said at least one cooling tube;

said retention element is configured to be arranged in integral contact with two cooling tubes;

said opening has a shape allowing a displacement of said retention element in a plane orthogonal to an axis of the opening of said fixing plate;

said opening has an oblong shape.

The present invention also relates to a cooling system for a turbomachine casing comprising a cooling tube, a retention device for at least one cooling tube according to the invention, said cooling tube being made integral with said retention device by brazing.

Advantageously, the cooling system for a turbomachine casing according to the invention comprises a plurality of cooling tubes, a plurality of retention devices, each retention device of said plurality ensuring the simultaneous retention and adjustment of the position of two adjacent cooling tubes with respect to the casing.

The invention also relates to a turbomachine low pressure turbine casing characterised in that it comprises a cooling system according to the invention arranged in a radially outer manner with respect to the casing.

The invention and its different applications will be better understood on reading the description that follows and by examining the figures that accompany it.

BRIEF DESCRIPTION OF THE FIGURES

The figures are only presented for illustrative purposes and in no way limit the invention.

FIG. 1b illustrates a second perspective view of the cooling system for a turbomachine casing illustrated in FIG. 1a.

Unless stated otherwise, a same element appearing in the different figures has a single reference.

DETAILED DESCRIPTION OF AT LEAST ONE EMBODIMENT OF THE INVENTION

Figure 1A:
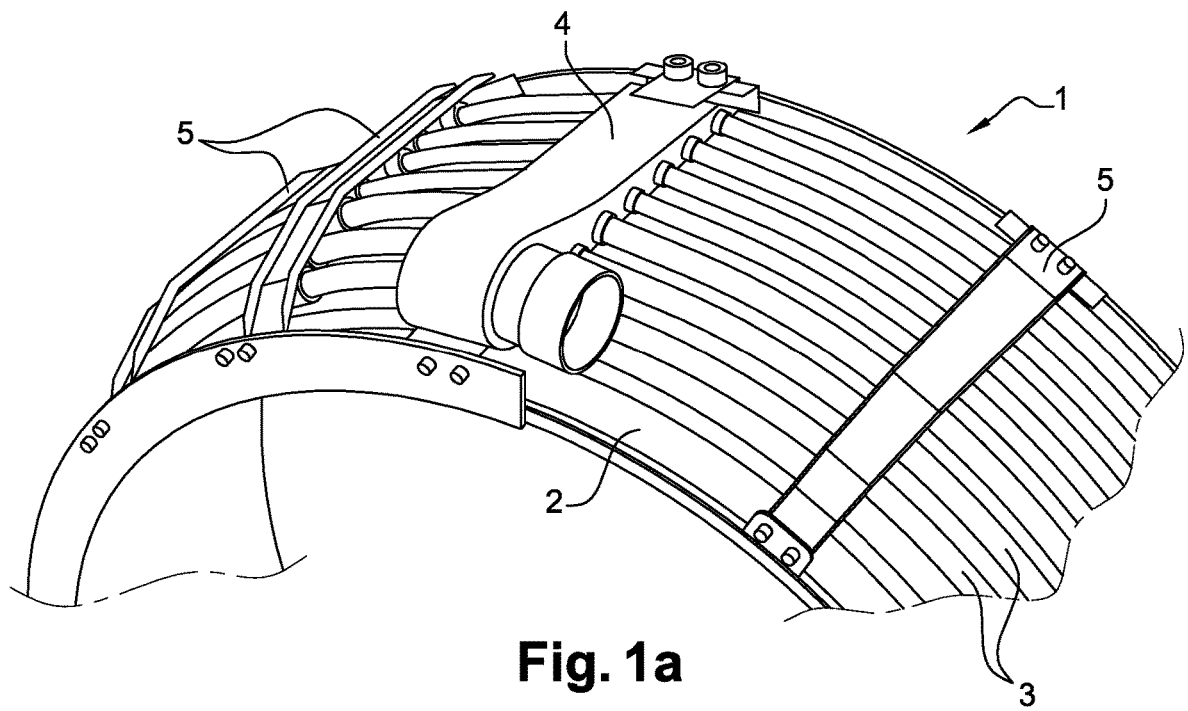
FIG. 1a illustrates a first perspective view of a cooling system for a turbomachine casing according to the prior art.
Figure 1B:
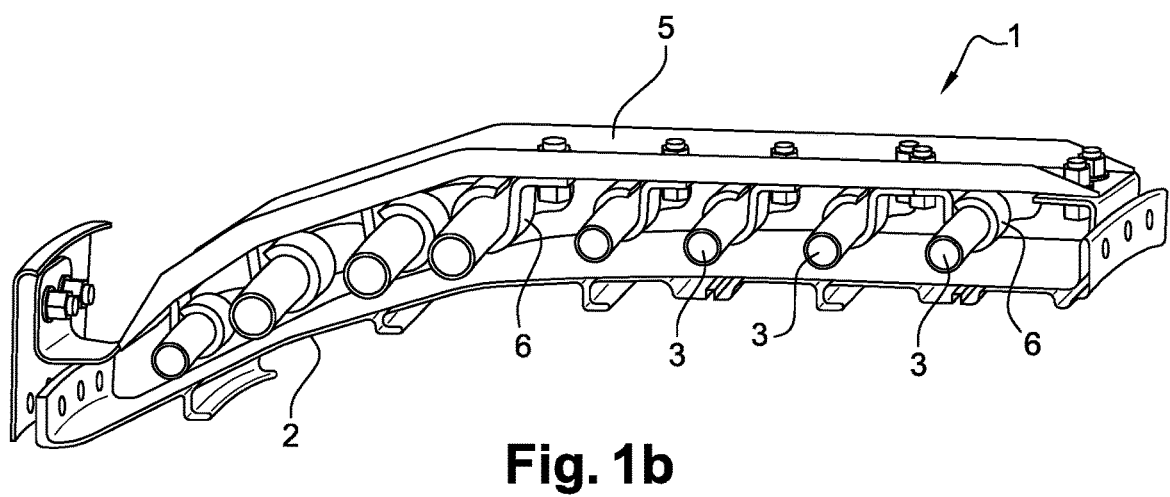

FIGS. 1a and 1b have already been described previously as technological background.

Figure 2:
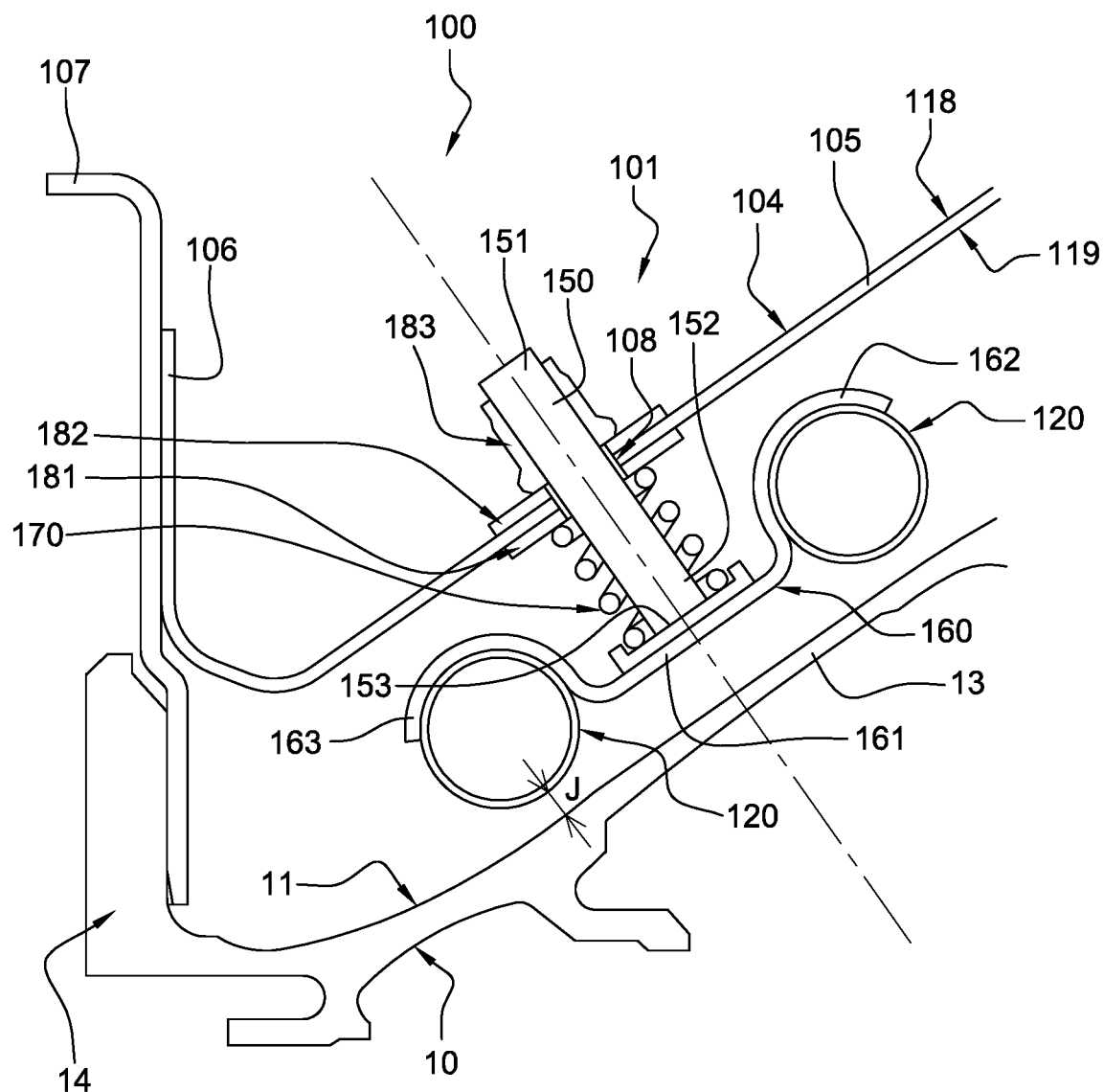
FIG. 2 is a partial sectional view of an exemplary embodiment of cooling system by air jets according to the invention mounted around a turbine casing.

FIG. 2 is a partial sectional view of an exemplary embodiment of a cooling system 100 by air jets according to the invention mounted around a turbomachine turbine casing 10. In the exemplary embodiment represented in FIG. 2, the casing 10 is a low pressure turbine casing.

The cooling system 100 according to the invention comprises:

a plurality of cooling tubes 120 (only two adjacent tubes are represented in FIG. 2) mounted around the casing 10;

a retention device 101 for the cooling tubes 120 for the positioning and the retention of the cooling tubes 120 around the casing 10.

The cooling system 100 in the example represented is a LPTACC (Low Pressure Turbine Active Clearance Control) cooling device. With typically two supply boxes, not represented in FIG. 2, the cooling tubes 120 and the retention device 101 constitute the cooling system 100 of the low pressure turbine casing 10. Such a system could also apply to a LPTCC cooling device without going beyond the scope of the invention.

Conventionally, the two cooling tubes 120 have small openings, not visible in FIG. 2. In operation, the supply boxes supply with air relatively fresh with respect to the casing 10 the cooling tubes 120, which send to the outer face 11 of the casing 10 the air thus available through small openings (not visible in the figure). Typically, the two supply boxes are arranged in a diametrically opposite manner on the casing 10. Thus, each zone of the cooling tubes 120 is supplied with air by a supply box arranged at less than a quarter turn of the casing 10, which makes it possible to have a sufficient air flow rate sent via the small openings of the cooling tubes 120 whatever the considered zone of the cooling tubes 120.

The retention device 101 notably comprises a fixing plate 104 having a main part 105, a first end 106 and a second end (not represented). The fixing plate 104 is made integral on the casing 10 through intermediate panels 107 integral with the ends of said fixing plate 104. The fixing plate 104 is integral with the intermediate panels 107 for example by riveting or instead by bolting.

The casing 10 has a body 13 and lateral edges 14 (a single edge being represented in FIG. 2). Each intermediate panel 105 is made integral on the casing 10 at the level of the lateral edges 14 of the casing 10, for example by riveting or by bolting.

The main part 105 of the fixing plate 104 has an outer face 118, an inner face 119, and at least one through opening 108. The main part 105 of the fixing plate 104 may comprise a portion or a plurality of portions, for example with recesses as illustrated in the document FR1258238. Each portion is globally flat and extends over the totality of the width of the main part 105 and two consecutive portions form an angle such that the main wall 104 thus follows the general shape of the casing 10 thanks to its different portions and to the angles that they form between each other and/or with each of the two ends.

The retention device 101 comprises an adjustment means making it possible to adjust the relative position of the cooling tubes 120 with respect to the fixing plate 104 and to absorb relative movements between the cooling tubes 120 and the fixing plate 104. The adjustment means comprise a body 150 traversing said at least one opening 108. The body 150 is for example of cylindrical shape. The body 150 is translationally movable through said opening 108 and more precisely along a direction transversal to the plane formed by the opening 108 or by the portion on which the opening 108 is provided. The relative position of the body 150 with respect to the fixing plate 108 is adjustable via a screwing element 183 detailed hereafter.

The body 150 of cylindrical shape has a first end 151 and a second end 152. The second end 152 is integral with a retention element 160 enabling the engagement of at least one cooling tube 120. The retention element 160 is for example a preformed retention plate.

According to the exemplary embodiment illustrated in FIG. 2, the retention plate 160 is for example obtained by forming and has a globally flat central part 161 and two ends 162, 163 of half-ring shape intended to hug and to cover, at least partially, the annular shape of two adjacent cooling tubes 120. The cooling tubes 120 are made integral on the retention plate 160 for example by brazing. The retention plate 160 advantageously makes it possible to make the cooling tubes integral at the level of a radially outer part of the cooling tubes, that is to say on the fixing plate 104 side, notably in such a way as to avoid the presence of a part or an additional element between the cooling tube 120 and the casing 10, and so as to be able to bring even closer the cooling tubes 120 to the casing 10 for the optimisation of the cooling thereof.

Advantageously, the retention plate 160 covers at least partially the circumference of the cooling tubes and uniquely a radially outer part of the cooling tubes 120, notably the circumference of the cooling tubes facing the fixing plate 104.

Advantageously, the retention plate 160, such as represented, makes it possible to make integral two cooling tubes 120 by means of a same and unique retention plate 160. In this embodiment, a retention and a positioning of two circumferentially adjacent cooling tubes is achieved by forming uniquely one opening 108 in the fixing plate 104. Thus, for a given turbomachine with a given number of cooling tubes, the fixing plate 104 according to the invention will have less opening 108 and less engagement zone than a fixing plate according to the prior art. However, it is also envisaged to produce a retention element making it possible to make integral individually a cooling tube so as to improve the precision of adjustment of the radial position of the cooling tubes 120 with respect to the casing 10.

According to the exemplary embodiment illustrated in FIG. 2, the second end 152 of the cylindrical body 150 has a cylindrical cup 153 of which the axis of revolution is oriented along the longitudinal axis of the cylindrical body 150. The cylindrical cup 153 is for example made integral with the cylindrical body 150 by brazing.

The cylindrical cup 153 notably makes it possible to form a bearing element and to create a sufficient contact surface for brazing of the retention element 160.

On the other hand, the cylindrical cup 153 forms a bearing element for a return spring 170. In the exemplary embodiment illustrated in FIG. 2, the return spring 170 is a compression spring mounted under the fixing plate and more precisely between the cylindrical cup 153 of the second end 152 of the cylindrical body 150 and the inner face 119 of the fixing plate 104. A first washer 181 is intercalated between the return spring 170 and the inner face 119 of the fixing plate 104. Thus, the return spring 170 is directly bearing on the first washer 181 and not on the fixing plate 104, notably to avoid phenomena of wear.

The return spring 170 is an elastic element participating in the adjustment of the position of the cylindrical body 150, and thus of the retention element 160 for the cooling tubes 120 and making it possible to absorb the relative movements between the cooling tubes 120 and the fixing plate 104, the relative movements notably originating from differential expansions between the different elements of the cooling system and the casing 10. The return spring 170 also makes it possible to absorb the vibrations of the turbomachine, thus avoiding breakage of the cooling system in operation.

At the level of the outer face 118 of the fixing plate 104, a screwing element 183, such as a nut, cooperates with a threaded portion of the cylindrical body 150 provided for example at the level of the first end 151 of the body 150. The screwing element 183 has a locking means making it possible to avoid any rotation thereof under the effect of vibrations. The screwing element 183 is for example a self-locking nut.

The return spring 170, the nut 183 cooperating with the threaded part of the body 150 form the adjustment means of the retention device 101 making it possible to modify the position of the retention element 160 and the cooling tubes with respect to the fixing plate 104, and with respect to the casing 10.

Advantageously, a second washer 182 is intercalated between the nut 183 and the outer face 118 of the fixing plate 104, such that the base of the nut 183 is in contact with the second washer 182 and not directly with the fixing plate 104, notably to avoid phenomena of wear.

Said at least one opening 108 provided in the fixing plate 104 is advantageously an opening of oblong shape thus allowing displacements of the cylindrical body 150, and the retention element 160, in a plane orthogonal to the axis of the opening 108 in such a way as to allow differential expansions of the cooling tubes 120 with respect to the casing 10 during operation.

Thus, thanks to the retention device according to the invention, it is possible to modify precisely the relative position of the retention element 160, and thus the cooling tubes 120, with respect to the casing 10 by a simple rotation of the nut 183. In the case where the threading provided on the first end 151 of the cylindrical body has a right-handed thread, then the screwing of the nut 183 causes a moving away of the cooling tubes 120 from the casing 10, the clearance J between the cooling tubes 120 and the casing 10 is then increased. Conversely, the unscrewing of the nut 183 causes a bringing closer of the cooling tubes 120 to the casing 10, the clearance J between the cooling tubes 120 and the casing 10 is then reduced. The return spring 170 makes it possible to exert a constant thrust on the retention element 160 in such a way that the nut 183 is constantly bearing on the washer 182, notably to guarantee correct positioning of the cooling tubes 120.

The retention device 101 according to the invention thus makes it possible to achieve a precise, simple, efficient adjustment by controlling the clearance J between the casing 10 and each cooling tube 120 or group of several cooling tubes 120 (for example two cooling tubes as represented in FIG. 2) by the elimination of a fixing collar entirely surrounding the cooling tube. Thus, the retention device according to the invention makes it possible to guarantee controlled positioning of the cooling tubes 120 with respect to the casing 10 in an individual manner (that is to say tube by tube) or in a grouped manner (by group of several cooling tubes). Thanks to the invention, the positioning of the cooling tubes 120 is controlled which makes it possible to improve cooling of the casing while minimising the risks of contact between the cooling tubes 120 and the casing 10 and thus the wear of the casing 10.

The invention claimed is:

1. A retention device for at least one cooling tube of a cooling system of a turbomachine casing, the casing extending around an axial direction of the turbomachine, the retention device comprising a fixing plate configured to being made integral with the casing and a retention element for the cooling tube, said retention device comprising an adjustment system configured to adjust a relative position of said retention element with respect to said fixing plate and to absorb a relative movement between the retention element and the fixing plate.

2. The retention device for at least one cooling tube of a cooling system of a turbomachine casing according to claim 1, wherein said fixing plate comprises an opening and wherein said adjustment system comprises a body integral with said retention element, said body being translationally moveable through said opening.

3. The retention device for at least one cooling tube of a cooling system of a turbomachine casing according to claim 2, wherein said body is a cylindrical body having a threaded portion.

4. The retention device for at least one cooling tube of a cooling system of a turbomachine casing according to claim 3, wherein said adjustment system comprises a screwing element cooperating with said threaded portion of said body to adjust the relative position of said retention element with respect to said fixing plate.

5. The retention device for at least one cooling tube of a cooling system of a turbomachine casing according to claim 4, wherein the screwing element is a self-locking nut.

6. The retention device for at least one cooling tube of a cooling system of a turbomachine casing according to claim 1, wherein said adjustment system comprises an elastic return element to absorb a relative movement between the retention element and the fixing plate.

7. The retention device for at least one cooling tube of a cooling system of a turbomachine casing according to claim 1, wherein said retention element is configured to be arranged in integral contact with a radially outer part of said at least one cooling tube.

8. The retention device for at least one cooling tube of a cooling system of a turbomachine casing according to claim 1, wherein said retention element is configured to be arranged in integral contact with two cooling tubes.

9. The retention device for a cooling tube of a cooling system of a turbomachine casing according to claim 1, wherein said opening has a shape allowing a displacement of said retention element in a plane orthogonal to an axis of the opening of said fixing plate.

10. The retention device for a cooling tube of a cooling system of a turbomachine casing according to claim 1, wherein said opening has an oblong shape.

11. A cooling system of a turbomachine casing comprising:
a cooling tube;
a retention device for at least one cooling tube according to claim 1, said cooling tube being made integral with said retention device by brazing.

12. The cooling system of a turbomachine casing according to claim 11, further comprising a plurality of cooling tubes, a plurality of retention devices, each retention device of said plurality ensuring the simultaneous retention and adjustment of the position of two adjacent cooling tubes.

13. A casing for a turbomachine low pressure turbine comprising a cooling system according to claim 11 arranged in a radially outer manner with respect to the casing.

* * * * *